PERCENTAGE MODULATION CONTROL NETWORK

Filed Dec. 30, 1948 2 Sheets-Sheet 1

Inventors
George H. Brown, &
George B. MacKimmie
BY J. L. Whittaker
ATTORNEY

March 6, 1951 G. H. BROWN ET AL 2,543,827

PERCENTAGE MODULATION CONTROL NETWORK

Filed Dec. 30, 1948 2 Sheets-Sheet 2

Inventors
George H. Brown, &
George B. MacKimmie
BY J. L. Whittaker
ATTORNEY

Patented Mar. 6, 1951 2,543,827

UNITED STATES PATENT OFFICE 2,543,827

PERCENTAGE MODULATION CONTROL NETWORK

George H. Brown, Princeton, N. J., and George B. MacKimmie, Montreal, Quebec, Canada, assignors to Radio Corporation of America, a corporation of Delaware Application December 30, 1948, Serial No. 68,276

10 Claims. (Cl. 332—38)

This invention relates to a percentage modulation control system. More particularly, it relates to a high frequency network for controlling the percentage of modulation which initially is impressed on a carrier by a modulator at a constant percentage.

In certain applications it is desirable to be able to control the percentage modulation of a radio frequency carrier without disturbing, as such, the operating conditions of a pre-set modulation device. For example, in an instrument landing system utilizing the absorption modulator shown in co-pending application Serial No. 36,249, filed June 30, 1948, now Patent No. 2,506,132, the required variable reactance elements are capacitors which have mechanically driven rotors which it is desirable to operate with fixed settings. In other cases where vacuum tube modulators are employed at ultra high frequencies their working conditions are inclined to be critical so that it is desirable not to disturb them, once they are set for satisfactory operation.

It is an object of the present invention to provide an ultra high frequency network for controlling the percentage of modulation of radio frequency energy.

It is a further object of this invention to devise such a network with a minimum of power dissipating elements so as to promote efficiency.

It is a further object of this invention to devise such a network in which adjustments of the percentage of modulation may be made by simple manipulation of a single manual control.

It is a further object of this invention to devise such a network in which adjustments may be made without altering the input impedance which the network presents to the source of radio frequency energy.

Other objects, features and advantages of this invention will be apparent to those skilled in the art from the following detailed description of an embodiment of the invention and from the drawing in which.

In the different figures of the drawing the same reference numerals or reference numerals which are the same except for an added letter will be used to designate like elements.

Figure 1:
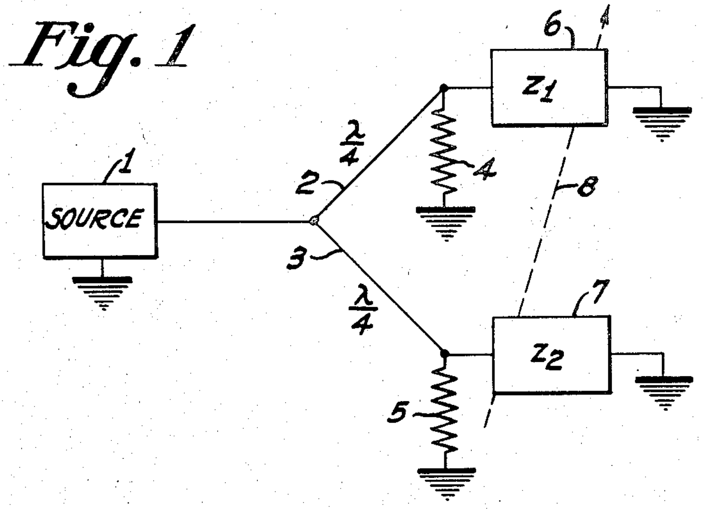
Figure 1 is a schematic diagram of a power dividing circuit which in substance is the equivalent of a subcombination used in several portions of the network to be described.

In the power division circuit of Figure 1 a radio frequency source 1 is connected through transmission lines 2 and 3 to resistive devices such as resistors 4 and 5, respectively. The lines 2 and 3, as well as all other transmission lines in Figures 1 and 4 of the drawing, are represented as single conductors. It is to be understood that said lines may be and preferably are co-axial cables, with their outer conductors grounded and not shown in the drawing. However, the following description will apply as well to systems using single wire conductors adjacent a conductive ground plane, or two conductor parallel wire transmission lines, or waveguide systems.

The resistors 4 and 5 are equal, and the lines 2 and 3 are designed to have a characteristic impedance $Z_c = R$, where R is the resistance of each resistor. The lines 2 and 3 each have a length of one quarter wavelength, or an odd number of quater wavelengths, at the frequency of the source 1. A variable impedance element 6 is connected in parallel with the resistor 4, and a second variable impedance element 7 is connected in parallel with the resistor 5. A unicontrol means 8 is provided for effecting synchronous and inverse variations in the impedances of elements 6 and 7. Denoting the impedance of the element 6 for any setting of means 8 as $Z_1$ and that of the element 7 as $Z_2$, said elements are designed or adjusted so that:

$$Z_1 Z_2 = Z_c^2$$

It can be demonstrated that the impedance presented by the above-described network to the source 1 is $Z_c$ and is constant irrespective of the individual impedances of the elements 6 and 7, so long as the foregoing relationship is satisfied. Assuming the voltage at the source to have a constant amplitude $E_{in}$, the amplitude $E_1$ of the voltage across the resistor 4 will depend on the impedance $Z_1$, being zero when $Z_1$ is zero and equal to $E_{in}$ when $Z_1$ is infinite. The voltage $E_2$ across the resistor 5 will also vary, its variations being in accordance with the accompanying variations of $Z_2$.

Thus, by varying the impedances of both elements 6 and 7 together and in inverse manner, the energy reaching the resistors 4 and 5 may be differently divided without reflecting any variation in load on the source 1. It can be demonstrated that this power dividing circuit causes a constant 90° difference in the phases of the waves fed to the two loads irrespective of how the input power is divided between them.

If in practice one of the resistors be a dummy absorption load and the other a utilization circuit, and if the variation of the impedances is continuous, the output to the utilization circuit will be amplitude modulated. If the impedances $Z_1$ and $Z_2$ were both pure resistances at all times, this modulation would be purely in amplitude, and the phase of the carrier signal at either the absorption load or the utilization load would remain constant with respect to that at the source 1. However, this will not be the case since it is difficult in practice to produce a pure radio frequency resistance varying according to a predetermined law, owing to the fact that resistance devices have inductance and/or capacitance which must be compensated.

$Z_1$ and $Z_2$ may be substantially pure reactances, varying as described above. It will be noted that when $Z_1$ is a positive (i. e., inductive) reactance, $Z_2$ must be capacitive, and vice versa. The required variable reactances may be provided by transmission line sections including movable shorting plugs or plungers which can vary the effective lengths of the line sections to vary the reactances they present.

For mechanical reasons, and particularly to avoid the use of sliding contacts, it is preferred at present to make the variable portions of the reactance elements in the form of variable capacitors. The varying capacitive reactance is transformed by means of a transmission line network to a reactance which varies in the required manner.

Figures 2, 3:
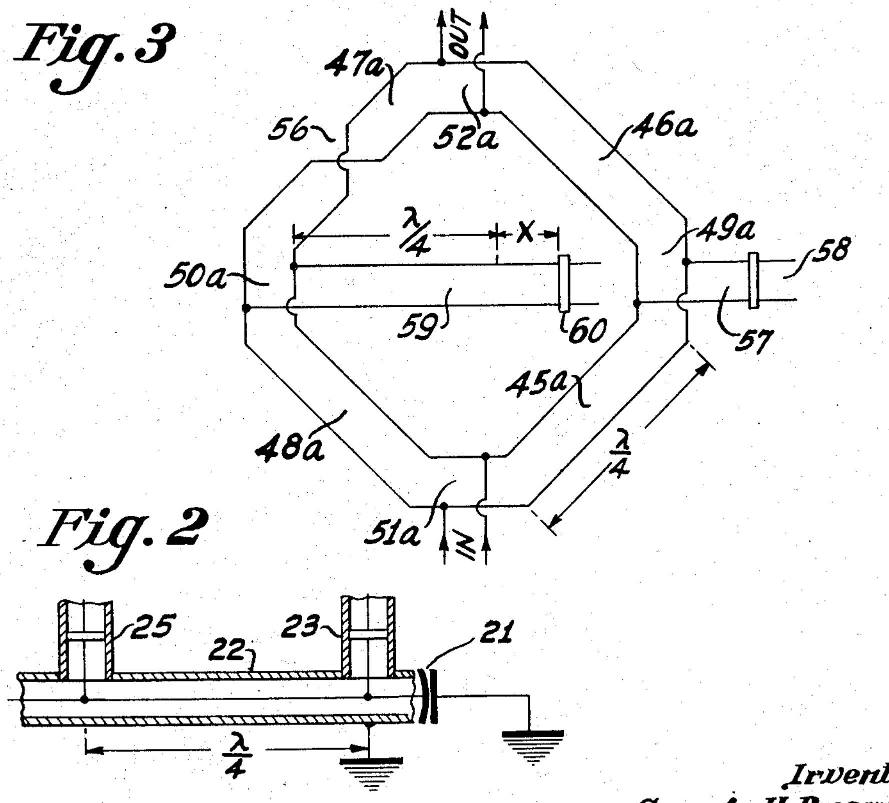
Figure 2 shows a coaxial line section used as a reactance transformer in a manner applicable to the power division circuit of Figure 1 and to other subcombinations of the network to be described.
Figure 3 is a schematic diagram which is referred to herein in describing the principles of operation of a phase shifter network comprising a subcombination of the network to be described.

Referring to Figure 2, a variable capacitor 21 is connected across one end of a quarter wavelength line section 22. An adjustable line stub 23 is connected in parallel with the capacitor 21, and a second adjustable stub 25 is connected across the other end of the quarter wave section 22. With the capacitor 21 set to provide its minimum capacitance (maximum reactance), the stub 23 is adjusted to provide an inductive reactance substantially equal to the capacitive reactance. The two reactances resonate to provide substantially an open circuit across the right hand end of the line 22. Owing to the impedance inversion characteristic of the quarter wave line, the high impedance at the right hand end of the line appears as a relatively very low impedance at the left hand end of the line.

The capacitor 21 is then set to provide its maximum capacitance. Since the capacitive reactance is now relatively low at the right hand end of the line, the high inductive reactance of the stub 23 has substantially no effect. The low capacitive reactance is inverted by the line 22 and appears as a relatively high inductive reactance at the left hand end of the line. The stub 25 is adjusted to provide a capacitive reactance substantially equal to this inductive reactance. The two reactances resonate to provide a very high impedance at the left hand end of the line 22.

As the capacitance of the capacitor 21 is varied from its minimum to its maximum value, the impedance appearing at the left hand end of the line 22 varies from a relatively low value to an extremely high value. Preferably the stubs 23 and 25 are adjusted so as to provide incomplete compensation of the reactances, so that the effective reactance at the left hand end of the line varies between a relatively low capacitive reactance and a relatively high inductive reactance.

The reactance element 6 in the network of Figure 1 may be a circuit like that shown in Figure 2. The element 7 may be similar but include a further quarter wavelength line section connected between the line 22 and the resistor 5. With this arrangement the capacitors in both reactance elements 6 and 7 may be varied in identical fashion. Supposing the reactances presented at a given instant by two variable reactance circuits, which both correspond to Figure 2 and respectively constitute all of the element 6 and a portion of the element 7, have a value jX; the reactance presented by the element 6 across the resistor 4 will be jX, whereas that presented by the element 7—because of its further quarter wavelength line section—will be:

$$X_1=\frac{(Z_c)^2}{jX}=\frac{-j(Z_c)^2}{X}$$

Thus the reactances applied across the resistors 4 and 5 will fulfill the relationship required for attaining a constant impedance $Z_c$ at the point of connection of the source 1.

Figure 4:
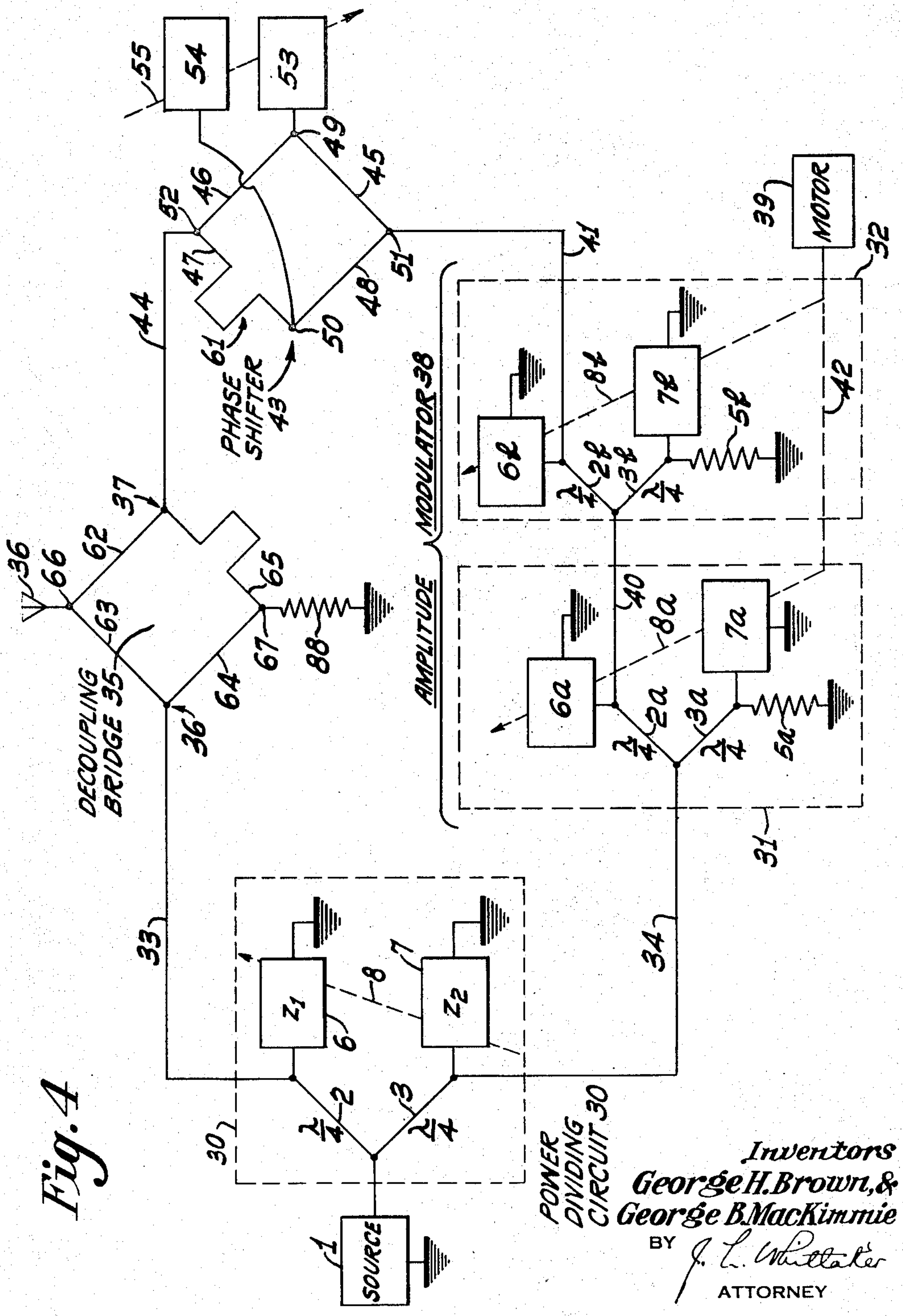
Figure 4 illustrates a percentage modulation network according to the present invention.

As shown in Figure 4, the percentage modulation control network includes three power dividing circuits 30, 31 and 32 which are all equivalents of that shown in Figure 1 and described above. The output ends of the branch lines 2 and 3 of power dividing circuit 30 are not connected to actual resistors as in Figure 1, but instead are respectively connected over output lines 33 and 34 to two load circuits which are equivalent to resistors 3 and 4 and respectively include connections to two opposite input corners 36, 37 of a decoupling bridge 35 which serves to combine energy from the branch lines 2 and 3 and to feed it to a final utilization load, such as antenna 36. As a result of this arrangement, depending on the adjustment of the unicontrol means 8, a certain portion of the pure carrier energy provided by source 1 will reach the left input corner 36 of the decoupling bridge 35 over the output line 33. The remainder will pass over output line 34 and will also be pure carrier energy at first, but before reaching the right input corner 37 of the decoupling bridge 35 it will be converted into a carrier and side bands by an amplitude modulator 38 which in the example shown herein is a kind of absorption modulator which comprises two power dividing circuits (31 and 32) and is shown in the above-mentioned co-pending application Serial No. 36,249, filed June 30, 1948.

The output line 34 feeds the power dividing circuit 31 as a source corresponding to source 1 feeding the power dividing circuit 30. Because of this, and also for reasons similar to those already explained for satisfying one of the conditions by which the source 1 will always encounter an impedance of $Z_c$ at the input of the power dividing circuit 30, the output line 34 should have a surge impedance equal to $Z_c$. For obviously similar reasons, this should also be true of the output line 33. In fact, it may be assumed that all connections between the subcombinations comprising the network of Figure 4 are made with transmission lines having this value of surge impedance.

Since in operation the power dividing network 31 performs a modulating function its reactance elements 6a and 7a are continuously varied automatically. To this end, a motor 39 is used to drive the rotors of their variable capacitors 21 (not shown in Figure 4). This is represented in Figure 4 by a mechanical link 42 which interconnects the motor 39 and the dotted line 8a representing the unicontrol means for the reactance elements 6a and 6b.

As was previously explained for Figure 1, when the capacitors 21 in the impedance elements 6a and 7a are varied together, there is an undesired side effect in addition to the desired effect that the voltage reaching either of the loads is modulated in amplitude without reflecting any variation in load on the source. To repeat, the undesired side effect is that this voltage will continuously vary in phase relative to the input voltage, $E_{in}$, approaching a lag of 90 degrees with respect to the voltage $E_{in}$ as the reactance of the element 6a approaches infinity, and approaching a lag of zero with respect to $E_{in}$ as the reactance approaches zero. Consequently, the circuit of Figure 1 when used with variable reactances as an amplitude modulator will also introduce undesired phase modulation.

Referring to dotted block 31 of Figure 4, the resistor 4 of Figure 1 is replaced by the additional power dividing circuit 32 which is also similar to the circuit of Figure 1 and which is useful for eliminating the above-mentioned side effect. The first power dividing circuit 31 of the modulator 38 acts as an energy source for the second power dividing circuit thereof, 32, and accordingly is connected thereto through a transmission line 40 of any convenient length. In the second power dividing circuit there is a transmission line 41 leading to the right corner input 37 of the bridge 35 as a utilization load circuit taking the place of the resistor 4 of the corresponding circuit of Figure 1. This second power dividing circuit may be substantially identical with the first, except that the reactances of the reactance element 6b and 7b are equal and opposite to those of the elements 6a and 7a. Thus if the reactance X of the element 6a is inductive, the reactance —X of the element 6b is capacitive. The reactance elements 6b and 7b may be structurally the same as the elements 6a and 7a but be mechanically varied differently to maintain the required relationships of sign and magnitude throughout the modulation cycle. Or they may be varied identically if an additional quarter wavelength of line be added to the output of each to transform its impedance.

Now suppose all four reactances 6a, 7a, 6b and 7b are varied simultaneously so that they remain equal in magnitude and maintain the above-described sign relationship. The power dividing circuit 31 will act as already described to producing both amplitude and phase modulation. The second power dividing circuit will accept the resulting modulated signal and modulate it still further; the amplitude modulation will be in phase with that produced by the first circuit, because the reactances X and —X of the two circuits are varied together. Thus, the total amplitude modulation will be in the square of that provided by either network.

The phase modulation introduced by the second circuit will be opposite to that of the first because the signs of the reactances are opposite, making the phase shift occur between the limits of zero and 90 degrees lead instead of zero and 90 degrees lag. Thus, the output to the transmission line 41 will be purely amplitude modulated.

The mechanical link 42 of Figure 4 indicates that the motor 39 drives the rotors of the capacitors 21 (not shown) of the reactance elements 6b and 7b as well as those (also not shown) of the reactance elements 6a and 7a.

Since the phase difference between the outputs of the power dividing circuit 30 will remain constant at 90° even though its unicontrol means 8 is adjusted, and since operation of the amplitude modulator 38 does not dynamically alter any static phase shift which its insertion into the network may produce in the carrier reaching it over the output conductor 34, it is possible continuously to combine in any desired constant phase relationship the modulated output delivered to transmission line 41 by the amplitude modulator 38 and the unmodulated carrier delivered to the output conductor 33 by the power dividing circuit 30. In the present network the decoupling bridge 35 serves as a means for combining them and a phase shifter 43 serves as a means for controlling their relative phase at the point where they are combined.

The phase shifter is not an essential part of this network. However, if it is dispensed with length of the output line 34 in degrees, the static phase shift produced by the amplitude modulator 38, and the lengths of transmission line 41, and a modulated-signal-feeder line 44 (which in the absence of the phase shifter 43, would merely be an extension of the transmission line 41) should have such a total length with respect to the length of the output line 33, and the phase difference between the outputs of the power dividing circuit 30, that the carrier energy reaching the left corner input 36 of the decoupling bridge 35 will be exactly in phase with the carrier component of the energy reaching its right-corner input 37.

As illustrated in Figures 3 and 4, the phase shifter 43 may be a circuit of the kind described in co-pending application Serial No. 35,895, filed June 29, 1948, and comprising a bridge-like arrangement formed of four transmission line sections 45, 46, 47 and 48 having two sets of conjugate terminals 49, 50 and 51, 52. The transmission line 41 and the modulated-signal-feeder line 44 are connected to the set of terminals 51, 52, and impedance devices 53 and 54 having equal and opposite reactances are connected to the set 49, 50. A ganged-control means 55 is manually operable for synchronously varying the reactances of devices 53 and 54 to control the relative phase between energy entering the bridge at terminal 51 and that leaving it at terminal 52.

The bridge portion of a phase shifter of this kind may be constructed of open wire transmission line sections, hollow wave guides, single wires adjacent to a conductive ground plane, or any other known transmission elements. However, it is preferred for this network, as schematically indicated in Figure 4, to use coaxial transmission lines having a surge impedance equal to $\sqrt{2}\cdot Z_c$. In order to explain the operation of the phase shifter bridge reference is made to Figure 3 which shows four open wire transmission line sections 45a, 46a, 47a and 48a connected serially in a closed loop to form a bridge-like circuit having two sets of conjugate pairs of terminals 49a, 50a and 51a, 52a at corner junctions of the line sections. Each of the line sections may have a length of one quarter, or an odd number of quarters, of a wavelength at the frequency of the carrier provided by the source 1. Any one of the line sections, for example, the section 47a, includes polarity reversing means such as a transposition 56. As an alternative, all of the lines except one may include such means.

A further transmission line section 57, provided with longitudinally adjustable short circuiting means such as a shorting bar 58, is connected to the junction 49a between the lines 45a and 46a. Another line section 59, similar to the section 57 but one quarter wavelength longer, is connected to the junction 50a between the lines 47a and 48a. The line section 59 is provided with shorting means 60 like that on the line 57. The junctions 51a and 52a are respectively the input and output of the phase shifter.

In the operation of the device of Figure 3, the shorting means 58 and 60 are set at positions on the lines 57 and 59 such that the effective lengths of said lines differ by a quarter wavelength. Thus, if the distance from the junction 49a to the bar 58 is $x$, the distance from the junction 50a to the bar 60 is $x+\lambda/4$.

Assuming that the line sections 45a, 46a, 47a and 48a of the same characteristic impedance, incident energy applied to the junction 51a will divide equally between the lines 45a and 48a, arriving in the same phase at the junctions 49a and 50a. At these points the energy divides again, part going out the respective lines 57 and 59, and part going along the lines 46a and 47a. Assuming the characteristic impedances of the lines 57 and 59 are equal, the currents flowing into the lines 46a and 47a will be equal.

Since the line 47a includes the transposition 56, the current and voltage at the end of the line 47a which is connected to the junction 52a will be equal and opposite to those at the corresponding end of the line 46a which is connected thereto. Thus, the currents which travel directly past the junctions 49a and 50a balance out at the junction 52a, and produce no output to the load.

The current flowing into the line 59 is reflected at the short circuit 60 and returns to the junction 50a, arriving at that point with a phase delay of $$4\pi\left(\tfrac{1}{4}+\frac{X}{\lambda}\right)$$

radians, referred to its original phase. Similarly, the current flowing into the line 57 is reflected and returns to the point 49a with a delay of $$\frac{4\pi x}{\lambda}$$

radians. These two currents are equal, and each divides equally at the respective junctions 50a and 49a. The currents flowing from the junctions 50a and 49a into the lines 48a and 45a arrive at the point 51a with a phase difference of $$4\pi\left(\tfrac{1}{4}+\frac{X}{\lambda}\right)-\frac{4\pi x}{\lambda}$$

or $\pi$ radians, i. e., they are 180 degrees out of phase and therefore cancel.

The reflected currents from the lines 59 and 57 which flow into the lines 47a and 46a arrive at the point 52a in phase with each other, owing to the reversal at the transposition 56. These currents combine to flow from the junction 52a to the load. Since no energy (except for losses in the line elements) is dissipated in the network, substantially all of the energy applied to the junction 51a flows out of the junction 52a to the load. The phase of energy reaching the point 52a around the right hand side of the bridge lags that at the point 51a by a constant $\pi$ introduced by the lines 45a and 46a, plus an amount $$\frac{4\pi x}{\lambda}$$

introduced by the shorted line 57. The phase lag introduced by the path including the lines 48a, 47a and 59 is 360 degrees greater and thus is the same.

It will be apparent that the phase difference between the input and the output to the described network may be varied at will by moving the shorting bars 58 and 60 together, and that the change in phase will be directly proportional to the distance the bars are moved. The amplitude of the output is determined only by that of the input so long as no substantial dissipation occurs in the lines 57 and 59, and therefore no variation in amplitude is introduced by changing the positions of the shorting bars 58 and 60.

Since a line terminated in an open circuit will reflect as well as one terminated in a short circuit, variable length open ended lines could be substituted for the shorted lines 57 and 59.

A shorted line of length $x$ in general exhibits, at a definite frequency, the characteristics of a pure reactance such as a capacitor or an inductor. Consequently, the line section 57 may be replaced wholly or in part by a lumped reactance element, providing the terminal portion of length $x$ of the line 59 is similarly replaced. Thus, a variable capacitor can be connected to the junction 49a, with a similar capacitor connected to the junction 50a through a quarter wave line. If the two capacitors are varied simultaneously in the same manner, the phase at the junction 52a will shift accordingly, without variation in amplitude.

The phase shift network is designed to match the impedance of the source and load devices as follows: Suppose the input and output impedances are to be $Z_c$. The characteristic impedances of the line sections 45a, 46a, 47a and 48a are made equal and their impedance is denoted $Y_1$. The characteristic impedances of the line sections 57 and 59 are also equal and the impedance is denoted $Y_2$. In order to match impedances to prevent reflections at the junctions 51a and 52a, the following relationship must be satisfied:

$$Z_3=\frac{Z_2^2}{2Z_1}Y_2=\frac{Y_1^2}{2Z_c}$$

Thus, assuming $Z_c$ and $Y_2$ are each 50 ohms, $Y_1$ must be $\sqrt{2}$ times 50 ohms, or about 70 ohms.

The transposition 56 of Figure 3 is replaced in the Figure 4 embodiment, which is formed of coaxial line sections, by a delay section 61 consisting of a half wavelength length of coaxial line. Since the delay in a half wavelength line section is $\pi$ radians or 180 degrees, the effect of this section is simply to reverse the phase, exactly as a transposition would do. It s ould be noted incidentally that a transformer or other known phase reversing device may be substituted for the transposition 56 in Figure 3 or the half wavelength line section 61 of Figure 4. In the illustrated embodiment of Figure 4, the total length of the line 47 and the additional section 61 is three quarters of one wavelength. The line sections 45, 46 and 48 are each one quarter wavelength, as are the line sections 45a, 46a and 48a in Figure 3.

In the operation of the percentage modulation control network the ganged-control means 55 of the phase shifter 43 is adjusted so that the carrier wave which reaches the left corner input 36 of the decoupling bridge 35 is in phase with the carrier component of the signal which reaches its right corner input 37.

The decoupling bridge 35 is of a well known type, being the same as that shown as network 20 in Figures 1 and 4 of co-pending application Serial No. 52,635, filed October 4, 1948, by George M. Brown. Bridge 35 comprises three arms 62, 63 and 64 each consisting of a quarter wavelength transmission line having a surge impedance of $\sqrt{2} \cdot Z_c$ and one arm 65 of a three quarter wavelength line of the same characteristic impedance—corresponding in this respect to the phase shifter 43. If the arms are formed of parallel-pair open lines all four of them may be made of the same length provided one (or three) of them includes an inversion like the inversion 56 of Figure 3. As mentioned above, the right and left corners of the bridge 35 are its inputs. The other corners are outputs, the upper one being a final utilization output 66 feeding the antenna 36 and the lower one being a dummy output 67 feeding an absorption load 68.

Energy received at the left input over the output line 33 will divide equally at the junction of the arms 63 and 64, half of it passing over each of these arms. The absorption load and the antenna 36 are designed so that they both have the same value of input impedance, this being such a value that each of the bridge inputs matches the characteristic impedance of the line feeding it. Thus, the final utilization load will absorb as much of the energy reaching it over arm 63 as the dummy load will absorb from that reaching it over arm 64, and equal amounts of unabsorbed energy will pass over arms 62 and 65 toward the right corner input 37. Because of the extra 180° delay in arm 65 the energy from it will be in phase opposition to that from arm 62 and they will cancel each other to produce voltage and current nulls at the right corner input 37. This will be true whether or not energy is arriving at this input over the modulated-signal-feeder line 44 and irrespective of how much energy may be arriving there from it. Since the bridge will act in the same way to produce voltage and current nulls at the right corner input 36 for energy fed into its opposite corner input 37, this circuit results in complete decoupling of the right and left hand "sources" irrespective of the relative levels of the energy supplied by them, and each of them will remain matched to the bridge irrespective of the level of the energy supplied by the other.

In normal operation, a certain amount of energy will enter each input of the bridge 35. As a result, the carrier frequency energy reaching the dummy output 67 over one of the arms 64 or 65 will be cancelled by that reaching it over the other and will not be wasted in the absorption load 68. The greatest waste of energy will occur in the absorption load when the two input power levels are markedly unequal. If the amplitude modulator 38 is initially set up and/or adjusted (with this in mind) to produce a high enough percentage of modulation as to require substantial amount of unmodulated energy to be fed into the left corner input 36 in order to deliver the desired (smaller) output percentage of modulation to the antenna, then the cancellation of energy at the dummy output 67 will be greater and less energy will be wasted in the absorption load 68.

Since arms 62 and 63 are of equal length, energy reaching the utilization output 66 from the right corner input 37 will still be in phase with that from the left corner input 36 and they will add together and both reach the antenna 36.

When the unicontrol means 8 is readjusted in one direction the portion of the carrier delivered to the amplitude modulator 38 from the source 1 will be reduced with the result that the amplitudes of the carrier and the side band components of the signal reaching the right corner input 37 of the bridge 35 will be reduced. At the same time, the portion of the pure carrier delivered to the left corner input 36 of the bridge 35 will increase. When this is added to the reduced modulated signal at the utilization output 66 the result will be an increased ratio of carrier to side bands, i. e., a lower percentage of modulation.

When the unicontrol means 8 is readjusted in the opposite direction converse effects are caused and the percentage of modulation is raised.

These adjustments will not affect the impedance match of the output of source 1 to the input of the percentage modulation control network nor that of the input of either the left or the right corner input, 36 or 37, to the output of the line feeding it. Moreover, these adjustments will not disturb the relative phase between the carrier reaching the left corner input 36 and the carrier component reaching the right corner input 37.

While the operation described so far involves controllably increasing the carrier energy, the network described herein also may be employed for controllably reducing it. This can be accomplished by interchanging the utilization and absorption loads, i. e., by connecting the utilization load to the corner of the bridge corresponding to dummy output 67 in the example shown herein and by connecting the absorption load to its corner corresponding to the utilization output 66 of the present example. In such an arrangement, at the input to the absorption load a portion of the unmodulated carrier energy received at the left corner input 36 will be additively combined with a portion of the carrier component entering the bridge at the right hand corner input 37 and they will both be absorbed in the absorption load; however, at the input to the utilization load a portion of the above-mentioned unmodulated carrier and a portion of the above-mentioned carrier component will cancel so that the utilization load will receive only the difference amount of carrier energy. If the power dividing circuit 30 is adjusted so that said unmodulated carrier and said carrier component are of equal magnitude the utilization load will receive only sideband energy, i. e., one hundred percent carrier suppression will be achieved.

We claim:

1. A network for controlling the relative carrier and sideband energies of a modulated signal comprising a source of carrier energy, a decoupling bridge having two inputs and a utilization output for receiving carrier energy at the two inputs without coupling the sources thereof and for combining them at the utilization output, means for dividing carrier energy from said source into two portions, means for applying one of said portions directly to one of the inputs of said decoupling bridge, means for amplitude modulating said other portion of the carrier energy, means for feeding said other portion of the carrier energy from said source to said last-mentioned means, and means for applying modulated carrier energy from said modulating means to the other input of said decoupling bridge.

2. A network as in claim 1 in which the means for modulating carrier energy comprises a first power dividing circuit, including a pair of mechanically variable reactance devices for amplitude modulating carrier energy with accompanying phase modulation and a second power dividing circuit, including another pair of mechanically variable reactance devices, for receiving the amplitude modulated output of the first power dividing circuit to increase its percentage of amplitude modulation with opposite accompanying phase modulation to cancel the phase modulation produced in the first power dividing circuit whereby the means for amplitude modulating does not introduce any overall phase modulation.

3. A network as in claim 1 in which the decoupling bridge is arranged to combine the carrier energy received at one input in phase opposition to the carrier component of the modulated carrier energy received at the other input whereby the carrier component of the combined modulated carrier energy is at least partially suppressed.

4. A network as in claim 1 in which the decoupling bridge is arranged to combine the carrier energy received at one input in the same phase with the carrier component of the modulated carrier energy received at the other input whereby the percentage modulation of the modulated carrier energy at said utilization output is less than that of the modulated carrier energy received at said other input of the bridge.

5. A percentage modulation control network comprising a power dividing circuit having one input terminal and two output branches and responsive to a received carrier signal to apply it in separate portions onto the two output branches and to deliver the portions to respective output terminals of the branches with a constant phase relationship between them, an amplitude modulator for receiving a carrier signal and impressing thereon amplitude modulation without substantial accompanying phase modulation, means for applying output signals from one of the branches of the power dividing circuit to said amplitude modulator; a final utilization load; a decoupling bridge, including two inputs, for combining-in-phase carrier signals of the same frequency applied separately to the two inputs and for delivering the combined signal to said final utilization load, the decoupling bridge being arranged so that the circuit feeding each of its inputs is completely decoupled from that feeding the other irrespective of the relative strength of the carrier signals which they deliver to the bridge, means for connecting an output of the amplitude modulator as a source to one of the two inputs of the bridge, and means for connecting the output terminal of the other branch of the power dividing circuit to the second of said two inputs of the bridge.

6. A percentage modulation control network comprising a power dividing circuit, having two output branches, for receiving unmodulated carrier energy from a source thereof and for controllably apportioning it between the two output branches, the power dividing circuit being arranged to establish a fixed phase relationship between portions of the carrier energy reaching respective output terminals of said branches, an amplitude modulator for receiving carrier energy from one of said output terminals and impressing amplitude modulations thereupon without any accompanying phase modulation, a decoupling bridge for receiving carrier energy from the other output terminal of the power dividing circuit and from an output of the amplitude modulator to combine them in phase, the decoupling bridge being so arranged that variations in the level of energy received at the bridge either from said other output terminal or from said output of the amplitude modulator does not affect the impedance match of the bridge to the other, and means for causing the carrier energy fed to the decoupling bridge from said other output terminal to be in phase with the carrier component of the modulated carrier fed to the bridge from the amplitude modulator.

7. A percentage modulation control network comprising a power dividing circuit including an input for receiving unmodulated carrier energy and two branches extending from the input and each having a length equal to one quarter of a wavelength, at the frequency of the carrier, multiplied by an odd integer, the power dividing circuit offering a constant input impedance to a source of carrier energy and producing a constant phase relationship between the outputs from its two branches over its entire range of power-division adjustment; means including one carrier-signal input terminal and one modulated-signal output terminal for amplitude modulating a carrier without occasioning any accompanying phase modulation thereof; means for connecting the carrier-signal input to one of the branches of the power dividing circuit; a decoupling bridge having a utilization output and a dummy-load output and two inputs, and arranged for combining in-phase at the utilization output energies separately received over the two inputs and for adding out-of-phase at the dummy-load output portions of said received energies, an absorption resistor connected and matched to the dummy-load output to absorb any energy remaining after said combining of energies thereat, a utilization load having an impedance equal to the absorption load and connected to the utilization output; means for connecting said other branch of the power dividing circuit to one of the inputs of the decoupling bridge; and means for connecting said modulated-signal output to the other input of the decoupling bridge so that the carrier component of modulated signals as received at the bridge will be in phase with the unmodulated signal received at it from said other branch.

8. A percentage modulation control network comprising a power dividing circuit including an input for receiving unmodulated carrier energy and two branches extending from the input each having a length equal to one quarter of a wavelength, at the frequency of the carrier, multiplied by an odd integer, a power dividing circuit offering a constant input impedance to a source of carrier energy and producing a constant phase relationship between the outputs from its two branches over its entire range of power-division adjustment; a means for receiving a carrier wave and amplitude modulating it without phase modulating it; means for connecting one of the branches of said power dividing circuit to the input of the means for modulating; means for combining in phase alternating current signals of the same frequency and phase received from two separate sources and for delivering the combined signals to a utilization load, the last-mentioned means being arranged so that variations in the strength of the signals from either of the sources will not affect the impedance offered by the means to the other source; means for connecting the other branch of the power dividing circuit as one source to the means for combining; means for coupling to the means for combining as a second signal source therefor said means for amplitude modulating, the last-mentioned means being so arranged that the carrier component of modulated carrier signals which it produces and delivers to the means for combining will be in phase with carrier signals received at the means for combining from said second branch.

9. A percentage modulation control network comprising: a power dividing circuit including two output branches, an input for receiving carrier energy and feeding it to said branches, two outputs at the respective output terminations of the branches, and means including variable impedances for adjusting what proportion of the input carrier energy is available to feed a load presented at each of said output terminations, the power dividing circuit being arranged so that adjustments made by varying said impedances do not affect the relative phase of the carrier energy appearing at said two output terminations; an amplitude modulator including means for receiving carrier energy from one of said output terminations and means for amplitude modulating it without causing phase modulation thereof; a decoupling bridge including four transmission line sections serially connected to form a closed loop, each of said sections having a length which is an integral odd number of quarter wavelengths at the frequency of said carrier; means for applying carrier energy from the other of said output terminations to an input juncture of a first two of said four sections of the bridge; means for applying the output of the amplitude modulator to an opposite input juncture formed by the other two sections of the bridge; an absorption load connected to a dummy-output juncture formed by one of said first two sections and one of said other two; a utilization load connected to a utilization-output juncture formed by the other of said first two sections and the other of said other two; means in series with the sections of the bridge to cause carrier energy entering said bridge at said first-mentioned input juncture to divide over said first two sections and to cancel at said opposite input juncture and carrier energy entering the bridge and said opposite input juncture similarly to cancel at said first-mentioned input juncture, said last-mentioned means causing portions of carrier energies entering the bridge separately but in the same phase at the two input junctures to cancel at said dummy-output juncture and portions thereof to add at the utilization-output juncture; and means for adjusting to the same phase carrier energies entering said two input junctures.

10. A network for controlling the relative carrier and side band energies of a modulated signal comprising means for connecting to a source of carrier energy, a decoupling bridge having two inputs and a utilization output for receiving carrier energy at the two inputs without coupling the sources thereof and for combining them at the utilization output, means coupling said source connecting means directly to one of the inputs of said decoupling bridge, means for amplitude modulating a portion of the carrier energy, means for coupling said source connecting means to said modulating means, and means for applying modulated carrier energy from said modulating means to the other input of said decoupling bridge.

GORGE H. BROWN.
G. B. MACKIMMIE.

REFERENCES CITED

The following references are of record in the file of this patent:

UNITED STATES PATENTS

| Number | Name | Date |
|---|---|---|
| 2,161,320 | Schulze-Herringen | June 6, 1939 |
| 2,214,041 | Brown | Sept. 10, 1940 |
| 2,295,351 | Luck | Sept. 8, 1942 |
| 2,462,841 | Bruck et al. | Mar. 1, 1949 |